US011719796B2

(12) United States Patent
Li et al.

(10) Patent No.: US 11,719,796 B2
(45) Date of Patent: Aug. 8, 2023

(54) SYSTEM AND METHOD FOR ULTRASONIC SIGNAL NOISE REMOVAL USING A DEEP NEURAL NETWORK

(71) Applicant: Volvo Car Corporation, Gothenburg (SE)

(72) Inventors: Ying Li, Sunnyvale, CA (US); Usha Nookala, Sunnyvale, CA (US); Sihao Ding, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 249 days.

(21) Appl. No.: 17/138,984

(22) Filed: Dec. 31, 2020

(65) Prior Publication Data

US 2022/0206130 A1    Jun. 30, 2022

(51) Int. Cl.
G01S 7/52      (2006.01)
G01S 15/10     (2006.01)
G06N 3/08      (2023.01)
G01S 7/539     (2006.01)
G06F 18/2132   (2023.01)

(52) U.S. Cl.
CPC .......... *G01S 7/52077* (2013.01); *G01S 7/539* (2013.01); *G01S 15/101* (2013.01); *G01S 15/104* (2013.01); *G06F 18/2132* (2023.01); *G06N 3/08* (2013.01)

(58) Field of Classification Search
CPC ...... G06N 3/08; G06K 9/6234; G01S 15/104; G01S 15/101; G01S 7/539; G01S 7/52077
See application file for complete search history.

(56) References Cited

U.S. PATENT DOCUMENTS

2019/0176846 A1*  6/2019  Movert ............... G06F 16/2455
2020/0226426 A1*  7/2020  Jarquin Arroyo .... G06V 10/776

FOREIGN PATENT DOCUMENTS

KR        102176302 B1 * 11/2020
WO   WO-2020213750 A1 * 10/2020
WO   WO-2021240290 A1 *  5/2021

OTHER PUBLICATIONS

Zhan et al., "Semi-Supervised Classification of Hyperspectral Data Based on Generative Adversarial Networks and Neighborhood Majority Voting", 2018 IEEE Geoscience and Remote Sensing Symposium (2018) (Year: 2018).*
WO-2020213750-A1 (Machine Translation) (Year: 2019).*
Pöpperl, "Realistic Ultrasonic Environment Simulation Using Conditional Generative Adversarial Networks", 2019 IEEE Intelligent Vehicles Symposium (IV), pp. 2278-2283, (2019) (Year: 2019).*

(Continued)

*Primary Examiner* — Yuqing Xiao
*Assistant Examiner* — Christopher Richard Walker
(74) *Attorney, Agent, or Firm* — Clements Bernard Walker; Christopher L. Bernard (57) ABSTRACT

The present disclosure provides a system and method for removing noise from an ultrasonic signal using a generative adversarial network (GAN). The present disclosure provides three input formats for the neural network (NN) in order to feed one-dimensional (1D) input data to the network. The system is generalizable to multiple noise sources, as it learns from different motion functions and noise types. The end-to-end system of the present disclosure is trained on raw ultrasonic signals with very little pre-processing or feature extraction.

20 Claims, 9 Drawing Sheets

(56) References Cited

OTHER PUBLICATIONS

Lyu, "DeGAN: Mixed Noise Removal Via Generative Adversarial Networks", Applied Soft Computing Journal 95 (2020) (Year: 2020).*

Esmaeilpour et al., "Unsupervised feature learning for environmental sound classification using Weighted Cycle-Consistent Generative Adversarial Network", Applied Soft Computing Journal 86 (2020) 105912 (Year: 2020).*

KR-102176302-B1 (Machine Translation) (Year: 2020).*

* cited by examiner

SYSTEM AND METHOD FOR ULTRASONIC SIGNAL NOISE REMOVAL USING A DEEP NEURAL NETWORK

TECHNICAL FIELD

The present disclosure relates generally to the automotive and ultrasonic sensor fields. More particularly, the present disclosure relates to a system and method for ultrasonic signal noise removal using a deep neural network (DNN).

BACKGROUND

An ultrasonic sensor is an important sensor in a vehicle for measuring distance and detecting the presence of nearby objects. In general, an ultrasonic sensor is a sound navigation and ranging (SONAR) device that emits short ultrasonic pulses that are reflected by obstacles around a vehicle and subsequently received and processed. The ultrasonic sensor includes and ultrasonic transducer consisting of a diaphragm containing a piezoceramic element. The ultrasonic sensor receives a digital transmission signal from an electronic control unit (ECU), which causes the diaphragm to oscillate, thereby generating the short ultrasonic pulses. The diaphragm then relaxes and receives the reflections from the obstacles, amplifies them, converts then from analog to digital (AD), and subsequently processes them to measure distance and detect the presence of the obstacles. Such ultrasonic data is very noisy due to the multi-path problem, well known to those of ordinary skill in the art, as well as sensor hardware shortcomings. Clean ultrasonic data is desirable for post-processing. One possible solution is conventional signal processing, but this is typically inadequate and inefficient.

It should be noted that this background is provided as illustrative context and environment only. It will be readily apparent to those of ordinary skill in the art that the principles of the present disclosure may be applied in other contexts and environments equally.

SUMMARY

The present disclosure provides a system and method for removing noise from an ultrasonic signal using a generative adversarial network (GAN). GANs have been shown to perform well in removing noise from images in a variety of contexts, providing sharper images. In general, a GAN is a DNN, such as a convolutional neural network (CNN), that, in an unsupervised machine learning (ML) operation, involves automatically discovering and learning patterns in input data such that the resulting model can be used to generate output that plausibly could have been resulted from the original dataset. The GAN frames a problem as a supervised learning problem with two sub-models: a generator model that generates new examples and a discriminator model that classifies examples as either real (i.e., from the domain) or fake (i.e., generated). The two models are trained together in an adversarial manner until the discriminator model is fooled about half the time, meaning the generator model is generating plausible examples. Such GANs are well known to those of ordinary skill in the art, but have not yet been applied to ultrasonic sensor noise removal. The present disclosure provides three input formats for the neural network (NN) in order to feed one-dimensional (1D) input data to the network. The system is generalizable to multiple noise sources, as it learns from different motion functions and noise types. The end-to-end system of the present disclosure is trained on raw ultrasonic signals with very little pre-processing or feature extraction.

In one illustrative embodiment, the present disclosure provides a method, including: receiving an input ultrasonic signal at a generator module of a generative adversarial network; and removing noise from the ultrasonic signal using the generator module of the generative adversarial network to generate an output denoised ultrasonic signal. The input ultrasonic signal includes a one-dimensional input ultrasonic signal received from an ultrasonic sensor. The one-dimensional input ultrasonic signal is pre-processed before being received at the generator module of the generative adversarial network by formatting the one-dimensional input ultrasonic signal into an M×N array and then copying the M×N array corresponding to a number of channels of the one-dimensional input ultrasonic signal, thereby forming a two-dimensional M×N array that replaces the input ultrasonic signal that is received at the generator module of the generative adversarial network. Alternatively, the one-dimensional input ultrasonic signal is pre-processed before being received at the generator module of the generative adversarial network by transforming the one-dimensional input ultrasonic signal into a two-dimensional M×N array that replaces the input ultrasonic signal that is received at the generator module of the generative adversarial network using a time-frequency domain transformer. Alternatively, the one-dimensional input ultrasonic signal is pre-processed before being received at the generator module of the generative adversarial network by encoding temporal information of the one-dimensional input ultrasonic signal into dimensions of each channel, with one channel representing each of a plurality of readings, thereby forming a two-dimensional M×N array that replaces the input ultrasonic signal that is received at the generator module of the generative adversarial network. The generator module of a generative adversarial network includes one of: a convolutional neural network; a speech enhancement generative adversarial network; and an encoder and a decoder with a self-attention block that is adapted to generate a condensed latent vector that is concatenated with a noise vector. The method further includes providing the output denoised ultrasonic signal to a discriminator module of the generative adversarial network adapted to compare the output denoised ultrasonic signal to a ground truth ultrasonic signal as part of a training process. The method further includes using the output denoised ultrasonic signal to determine a distance to an obstacle adjacent to a system providing the input ultrasonic signal including information related to the obstacle.

In another illustrative embodiment, the present disclosure provides a system, including: memory storing a generator module of a generative adversarial network adapted to receive an input ultrasonic signal and remove noise from the ultrasonic signal to generate an output denoised ultrasonic signal. The input ultrasonic signal includes a one-dimensional input ultrasonic signal received from an ultrasonic sensor. The system further includes memory storing an input module adapted to pre-process the one-dimensional input ultrasonic signal before it is received at the generator module of the generative adversarial network by formatting the one-dimensional input ultrasonic signal into an M×N array and then copying the M×N array corresponding to a number of channels of the one-dimensional input ultrasonic signal, thereby forming a two-dimensional M×N array that replaces the input ultrasonic signal that is received at the generator module of the generative adversarial network. Alternatively, the system further includes memory storing an input module adapted to pre-process the one-dimensional input ultrasonic signal before it is received at the generator module of the generative adversarial network by transforming the one-dimensional input ultrasonic signal into a two-dimensional M×N array that replaces the input ultrasonic signal that is received at the generator module of the generative adversarial network using a time-frequency domain transformer. Alternatively, the system further includes memory storing an input module adapted to pre-process the one-dimensional input ultrasonic signal before it is received at the generator module of the generative adversarial network by encoding temporal information of the one-dimensional input ultrasonic signal into dimensions of each channel, with one channel representing each of a plurality of readings, thereby forming a two-dimensional M×N array that replaces the input ultrasonic signal that is received at the generator module of the generative adversarial network. The generator module of a generative adversarial network includes one of: a convolutional neural network; a speech enhancement generative adversarial network; and an encoder and a decoder with a self-attention block that is adapted to generate a condensed latent vector that is concatenated with a noise vector. The generator module of the generative adversarial network is further adapted to provide the output denoised ultrasonic signal to a discriminator module of the generative adversarial network adapted to compare the output denoised ultrasonic signal to a ground truth ultrasonic signal as part of a training process. The system further includes memory storing a processing module adapted to use the output denoised ultrasonic signal to determine a distance to an obstacle adjacent to a system providing the input ultrasonic signal including information related to the obstacle.

In a further illustrative embodiment, the present disclosure provides a non-transitory computer-readable medium including instructions stored in a memory and executed by a processor to execute the steps, including: receiving an input ultrasonic signal at a generator module of a generative adversarial network; and removing noise from the ultrasonic signal using the generator module of the generative adversarial network to generate an output denoised ultrasonic signal. The input ultrasonic signal is pre-processed before being received at the generator module of the generative adversarial network. The generator module of a generative adversarial network includes one of: a convolutional neural network; a speech enhancement generative adversarial network; and an encoder and a decoder with a self-attention block that is adapted to generate a condensed latent vector that is concatenated with a noise vector. The steps further include providing the output denoised ultrasonic signal to a discriminator module of the generative adversarial network adapted to compare the output denoised ultrasonic signal to a ground truth ultrasonic signal as part of a training process.

BRIEF DESCRIPTION OF THE DRAWINGS

The present disclosure is illustrated and described with reference to the various drawings, in which like reference numbers are used to denote like system components/method steps, as appropriate, and in which.

DESCRIPTION OF ILLUSTRATIVE EMBODIMENTS

Again, the present disclosure provides a system and method for removing noise from an ultrasonic signal using a GAN. GANs have been shown to perform well in removing noise from images in a variety of contexts, providing sharper images. In general, a GAN is a DNN, such as a CNN, that, in an unsupervised ML operation, involves automatically discovering and learning patterns in input data such that the resulting model can be used to generate output that plausibly could have been resulted from the original dataset. The GAN frames a problem as a supervised learning problem with two sub-models: a generator model that generates new examples and a discriminator model that classifies examples as either real (i.e., from the domain) or fake (i.e., generated). The two models are trained together in an adversarial manner until the discriminator model is fooled about half the time, meaning the generator model is generating plausible examples. Such GANs are well known to those of ordinary skill in the art, but have not yet been applied to ultrasonic sensor noise removal. The present disclosure provides three input formats for the NN in order to feed 1D input data to the network. The system is generalizable to multiple noise sources, as it learns from different motion functions and noise types. The end-to-end system of the present disclosure is trained on raw ultrasonic signals with very little pre-processing or feature extraction.

Figure 1:
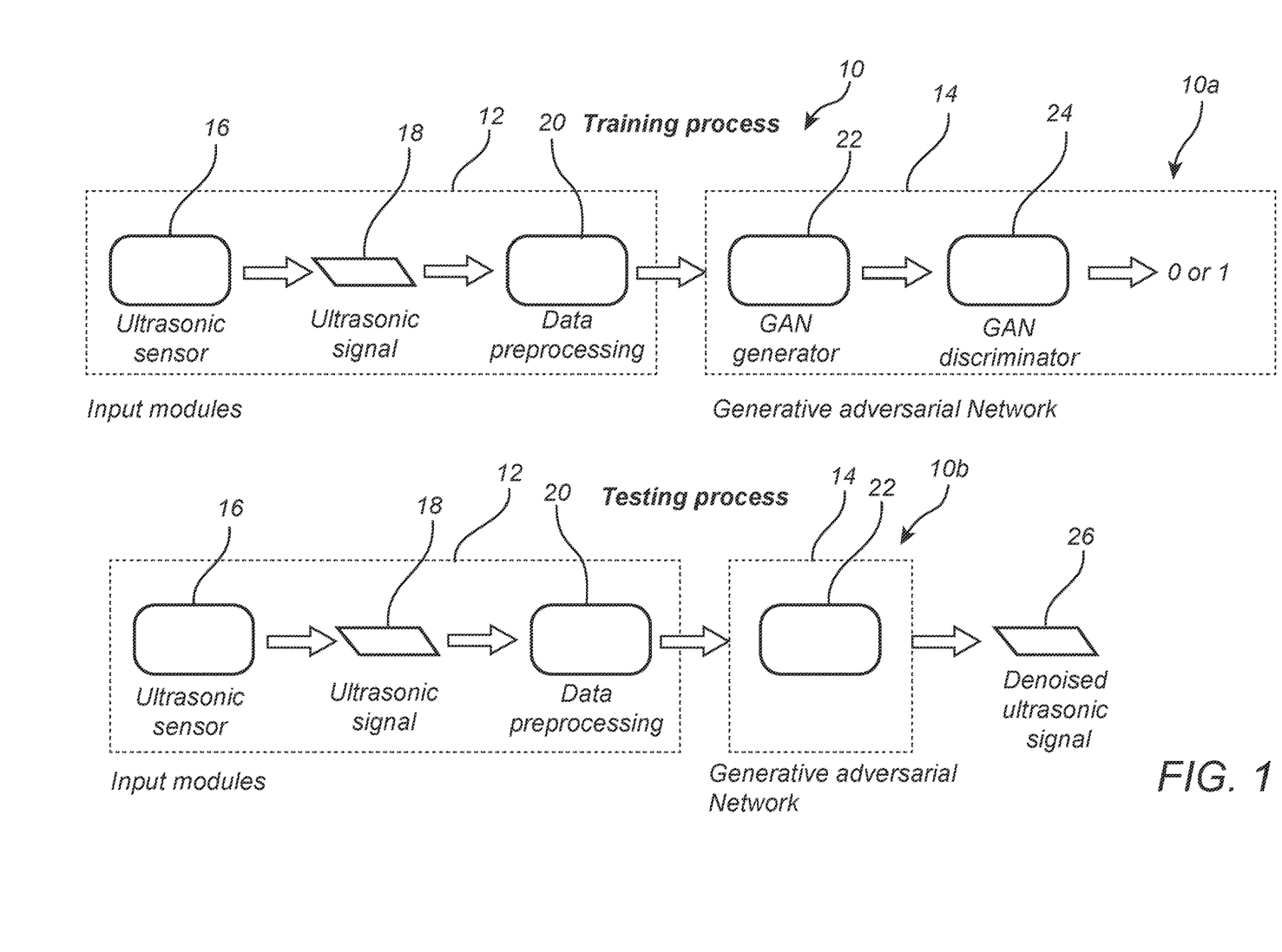
FIG. 1 is a schematic diagram of one illustrative embodiment of the ultrasonic signal noise removal system of the present disclosure, as used in both training and testing processes.

FIG. 1 is a schematic diagram of one illustrative embodiment of the ultrasonic signal noise removal system 10 of the present disclosure, as used in both training 10a and testing 10b processes. The ultrasonic signal noise removal system 10 includes both an input module 12 and a GAN module 14. The input module 12 includes an ultrasonic sensor 16 from which a raw 1D ultrasonic signal 18 is received, for both training and testing purposes. In this illustrative embodiment, a data pre-processing module 20 is provided to for converting the raw 1D ultrasonic signal to a pre-processed two-dimensional (2D) ultrasonic signal. This pre-processing may take one of three possible forms, as described in greater detail herein below. The pre-processed 2D ultrasonic signal is received at a GAN generator 22 of the GAN module 14. In the training process, this GAN generator 22, also described in greater detail herein below, is used to generate denoised ultrasonic signals 26 that are evaluated by the coupled GAN discriminator 24 as being real or fake (0 or 1), thereby training the GAN generator 22. In the testing process, the trained GAN generator 22 is simply used to generate a denoised ultrasonic signal 26, which is the desired output of the present disclosure.

Figure 2:
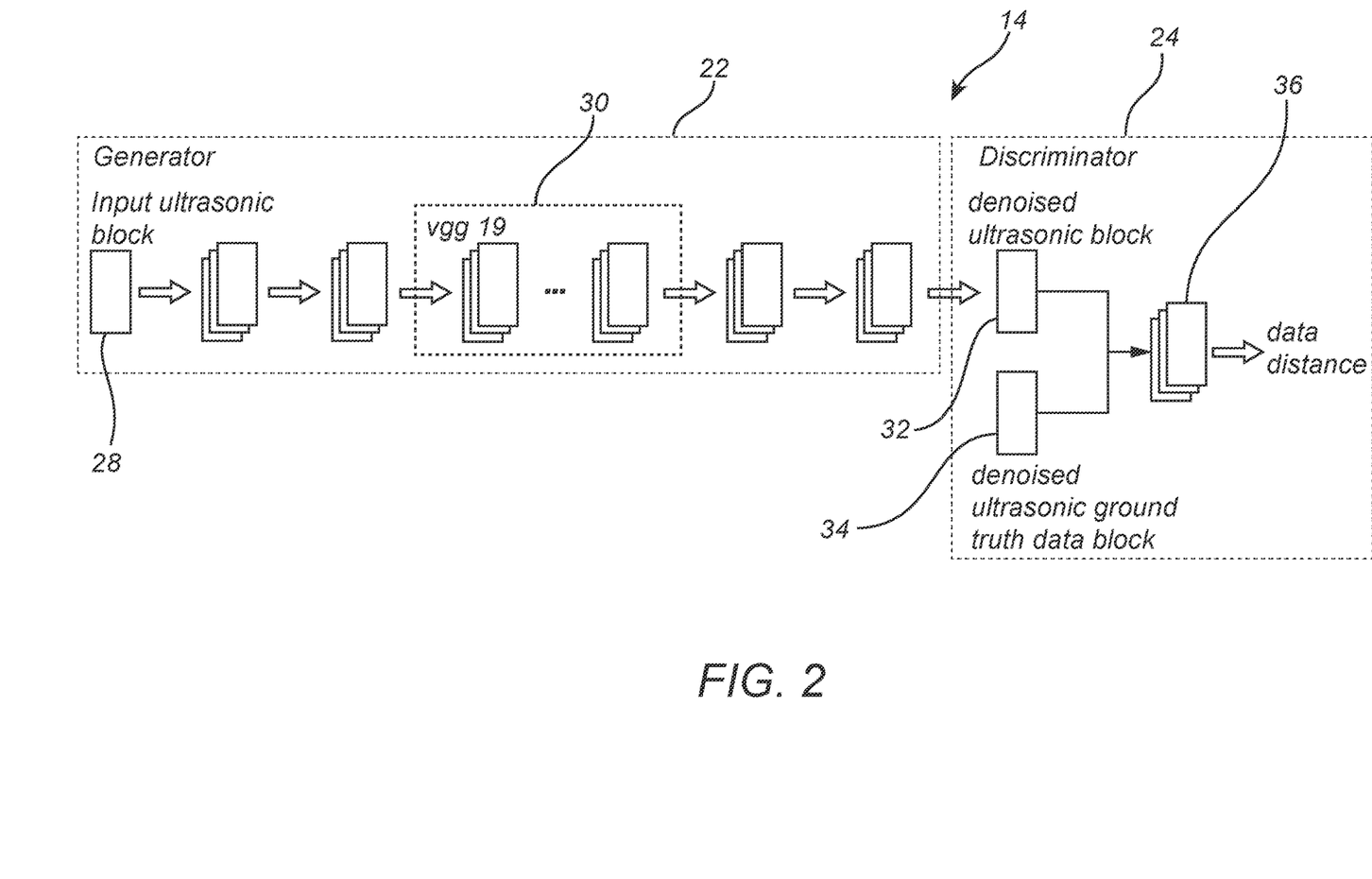
FIG. 2 is a schematic diagram of one illustrative embodiment of the GAN module of the ultrasonic signal noise removal system of the present disclosure.

FIG. 2 is a schematic diagram of one illustrative embodiment of the GAN module 14 of the ultrasonic signal noise removal system 10 (FIG. 1) of the present disclosure. The GAN generator 22 receives the pre-processed 2D input ultrasonic signal block 28, as described in greater detail herein below, from the input module 12 (FIG. 1) and processes it using a CNN 30, such as a vgg19 CNN structure or the like, to generate a denoised ultrasonic signal block 32 that is received by the GAN discriminator 14 in the training process 10a of FIG. 1. In the training process 10a, this denoised ultrasonic signal block 32 is compared with a denoised ultrasonic ground truth data block 34 to determine an associated data distance 36 indicate a degree of realness or fakeness of the input ultrasonic signal block 28, thereby evaluating the appropriateness of the GAN generator 22 such that it generates real, ground truth data. Again, in the testing process 10b of FIG. 1, the GAN discriminator 14 is not used and the desired output is the denoised ultrasonic signal block 32 generated by the trained CNN 30. Again, the pre-processed 2D input ultrasonic signal block 28 can be produced by three possible methods for training purposes.

Figure 3:
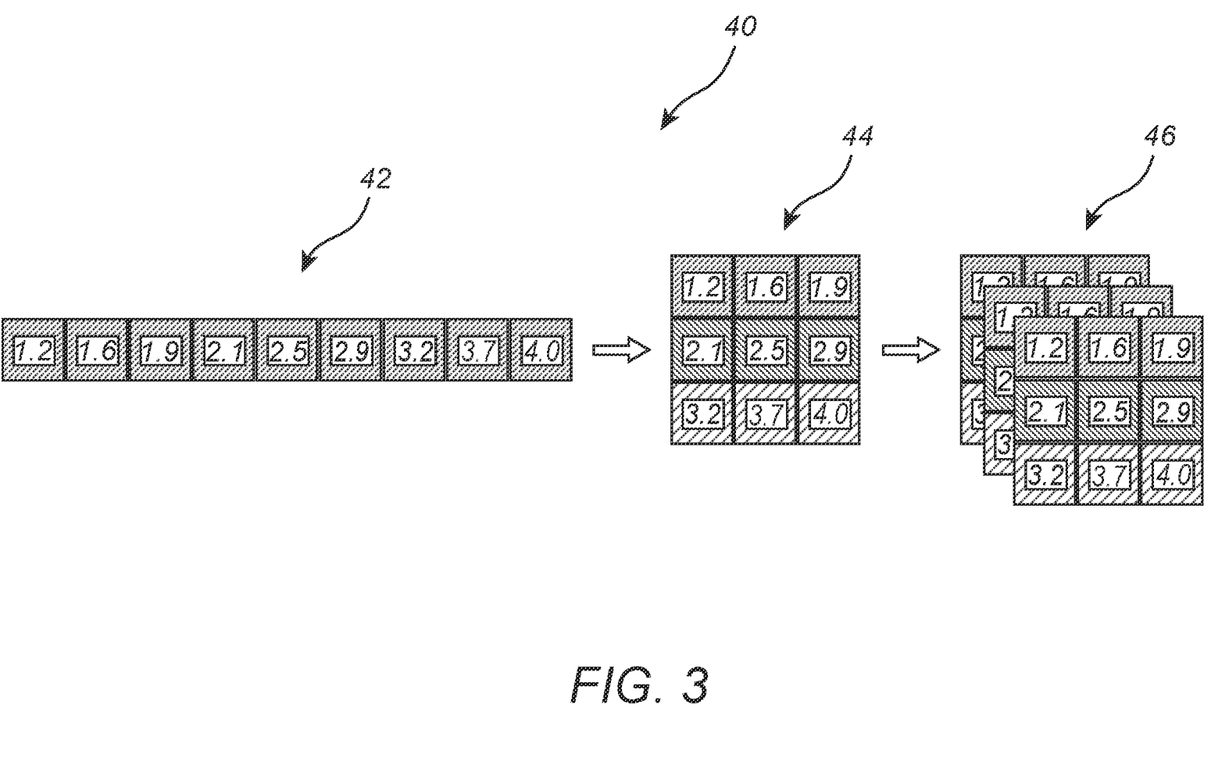
FIG. 3 is a schematic diagram illustrating one illustrative embodiment of a method for pre-processing input ultrasonic data to generate an input ultrasonic block that is provided to the GAN module of FIGS. 1 and 2, especially for training purposes.

FIG. 3 is a schematic diagram illustrating one illustrative embodiment of a method 40 for pre-processing input ultrasonic data 42 to generate an input ultrasonic block 46 that is provided to the GAN module 14 of FIGS. 1 and 2, especially for training purposes. Here, the input ultrasonic data 42 is a 1D array that is reshaped into the 2D M×N matrix of the input ultrasonic block 46 using historical data. The time sequence is first reformatted into the M×N array 44. The channel dimension is then extended from one to three by copying the M×N matrix 44 twice. This results in the 2D M×N matrix of the input ultrasonic block 46.

Figures 4, 5:
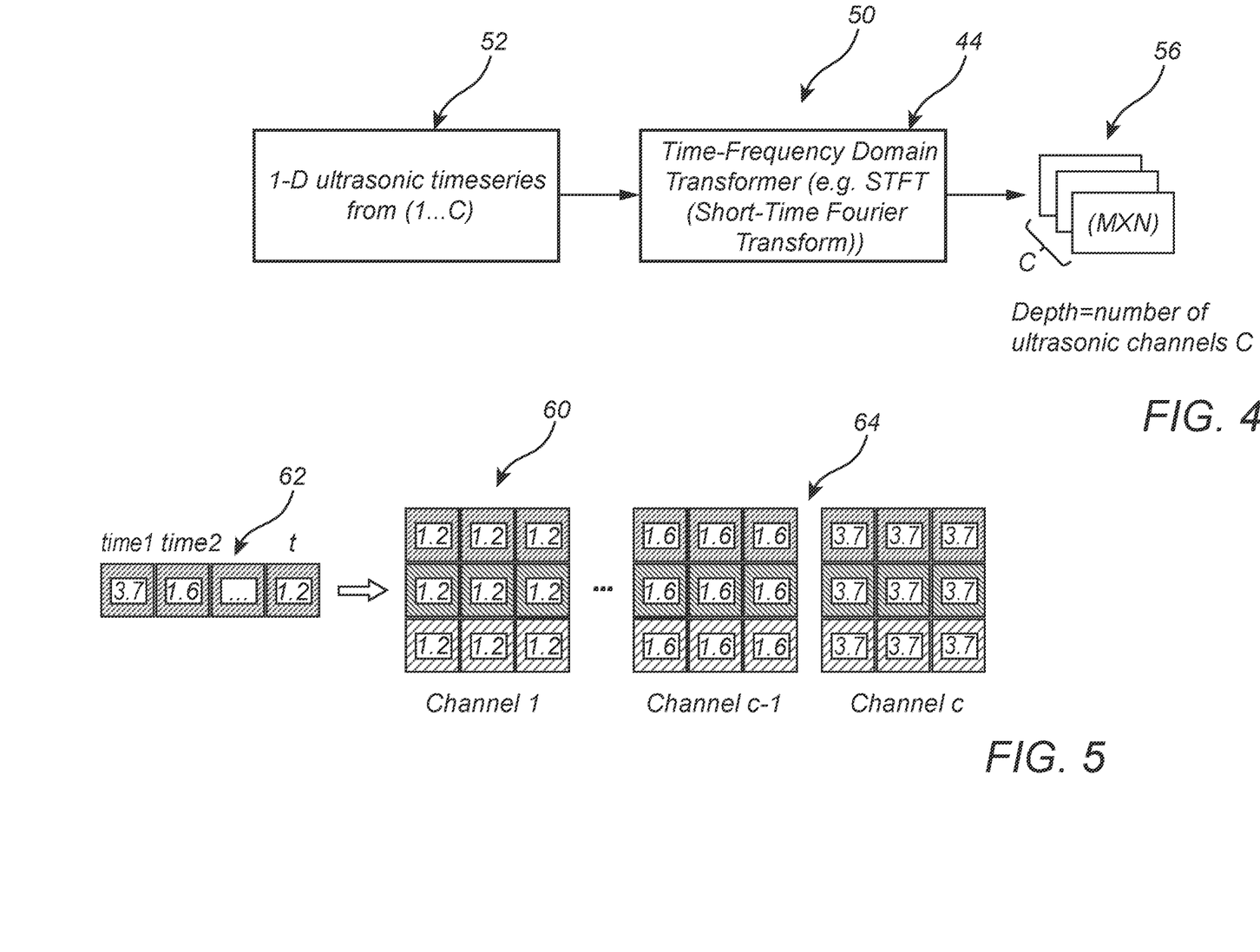
FIG. 4 is a schematic diagram illustrating another illustrative embodiment of a method for pre-processing input ultrasonic data to generate an input ultrasonic block that is provided to the GAN module of FIGS. 1 and 2, especially for training purposes.
FIG. 5 is a schematic diagram illustrating a further illustrative embodiment of a method for pre-processing input ultrasonic data to generate an input ultrasonic block that is provided to the GAN module of FIGS. 1 and 2, especially for training purposes.

FIG. 4 is a schematic diagram illustrating another illustrative embodiment of a method 50 for pre-processing input ultrasonic data 52 to generate an input ultrasonic block 56 that is provided to the GAN module 14 of FIGS. 1 and 2, especially for training purposes. Here, the input ultrasonic data 52 is a 1D time-frequency representation of the ultrasonic signals that is reshaped into the 2D M×N matrix of the input ultrasonic block 56, with a depth that is equal to the number of ultrasonic channels, C. In order to use the 2D CNN, the input signal must be interpreted using a 2D representation. A spectrogram of the 1D ultrasonic signal 52 is represented as a 2D matrix consisting of the temporal components as columns, M, and the spectral components as rows, N, using a time-frequency domain transformer 54 (e.g., a short-time Fourier transform (STFT)). Therefore, the input dimension is M×N for the 1D ultrasonic time series 52. For the C channels of the ultrasonic inputs 52, the input is extended along the depth axis. Therefore, the final input dimension is M×N×C.

FIG. 5 is a schematic diagram illustrating a further illustrative embodiment of a method 60 for pre-processing input ultrasonic data 62 to generate an input ultrasonic block 64 that is provided to the GAN module 14 of FIGS. 1 and 2, especially for training purposes. Raw ultrasonic data is used as the input 62. Temporal information is encoded in the channel dimension. One channel represents one reading, and C channels represent C readings. If the dimension for one channel is N×N, the network input 64 is calculated as illustrated.

Figure 6:
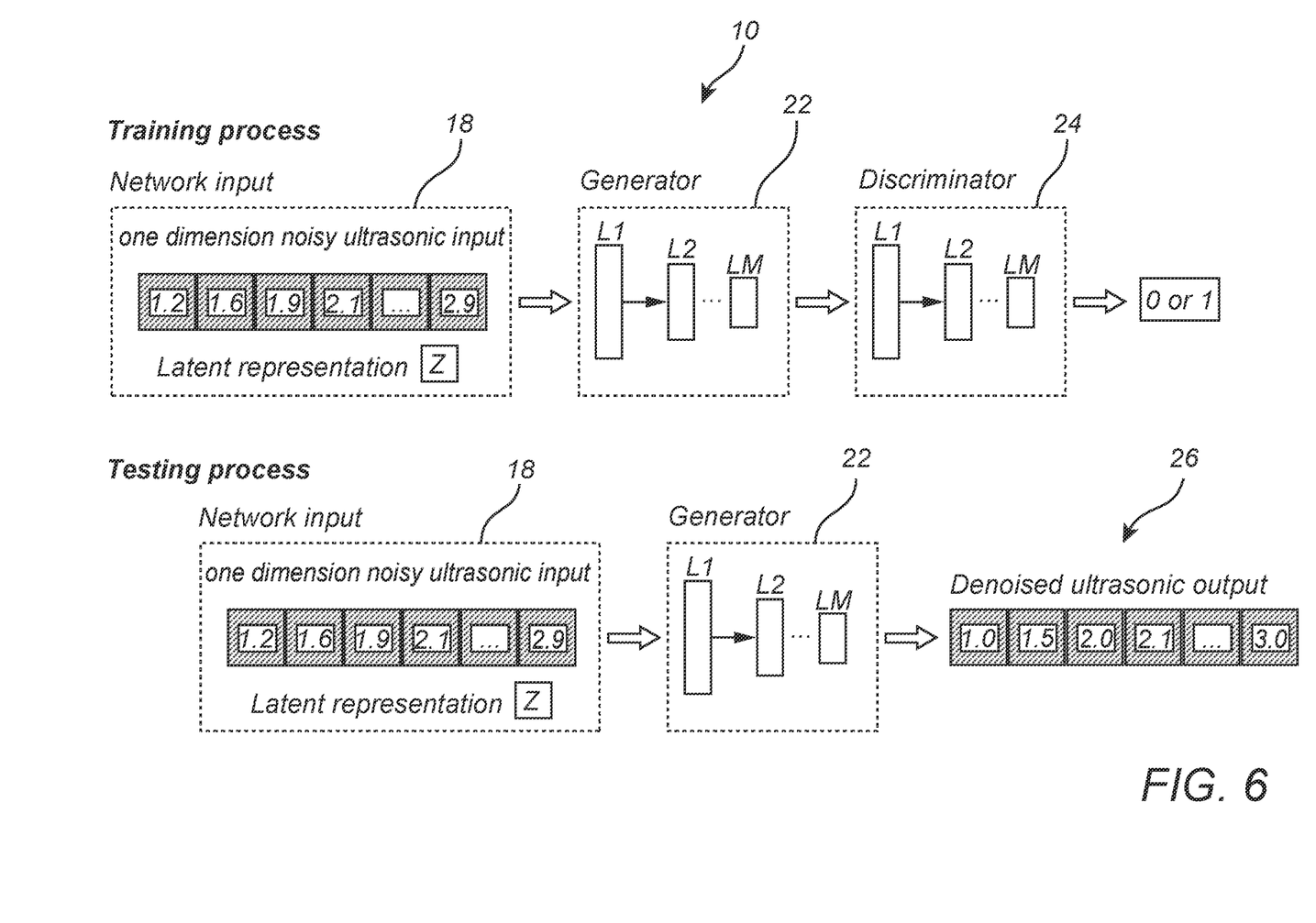
FIG. 6 is a schematic diagram of another illustrative embodiment of the ultrasonic signal noise removal system of the present disclosure, as used in both training and testing processes.

FIG. 6 is a schematic diagram of another illustrative embodiment of the ultrasonic signal noise removal system 10 of the present disclosure, as used in both training and testing processes. Here, 1D noisy ultrasonic signals 18 are again used as input to a generator 22, in both training and testing processes, and a discriminator 24, in the training process. The result of the testing process is again a denoised ultrasonic output 26. In this illustrative embodiment, the generator is a speech enhancement GAN (SEGAN), which is widely used for audio denoising. As audio and ultrasonic data are both 1D, the SEGAN can be modified to be used in ultrasonic signal denoising. Again, the generator 22 generates a signal that represents the enhanced ultrasonic signal and the discriminator discriminates whether each enhanced ultrasonic signal is real or fake in the training process. These two parts are trained together. After the training process is complete, only the generator 22 is used to perform denoising.

Figure 7:
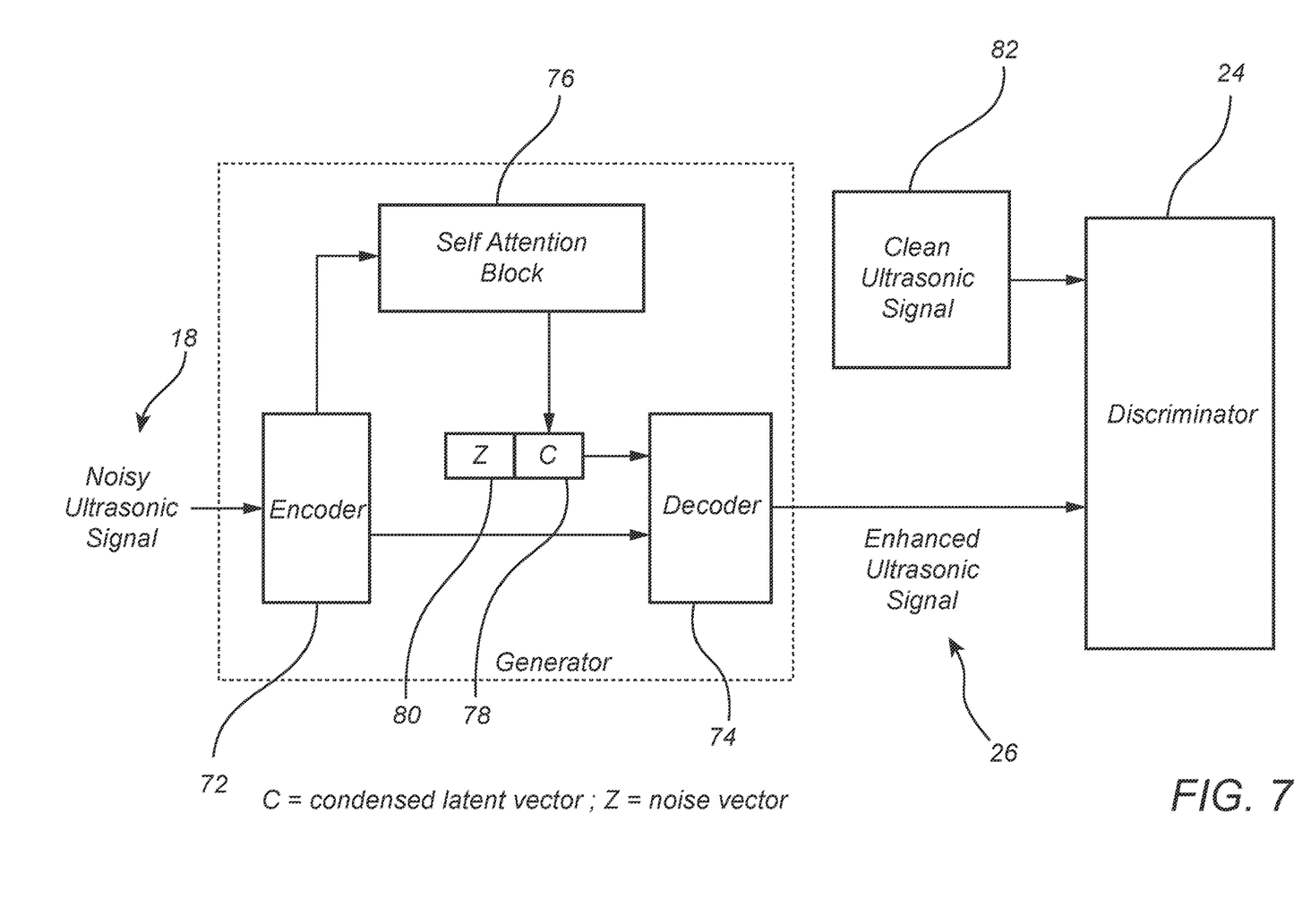
FIG. 7 is a schematic diagram of a further illustrative embodiment of the ultrasonic signal noise removal system of the present disclosure, as used in both training and testing processes.

FIG. 7 is a schematic diagram of a further illustrative embodiment of the ultrasonic signal noise removal system 70 of the present disclosure, as used in both training and testing processes. As before, the raw 1D noisy ultrasonic signals 18 are input to a generator 22, in both training and testing processes, and a discriminator 24, in the training process. Here, the generator 22 includes an encoder 72 and a decoder 74. The encoder 72 feeds a self-attention (SA) block 76 that provides a condensed latent vector 78, C, that is concatenated with a noise vector 80, Z, prior to the decoder 74. The output of the decoder is an enhanced ultrasonic signal 26 that, in the training process, is fed to the discriminator 24, along with a clean ultrasonic signal 82 for comparison purposes. The SA block 76 is used to model the long range dependencies of the time series, capturing time correlations effectively. Collectively, the encoder 72 and SA block 76 provide a condensed representation 78 that concatenated with the noise vector 80 decode the generated enhanced ultrasonic signal 26. Thus, the generator network is trained with an adversarial loss plus content (L1) loss to generate the enhanced ultrasonic signal 26.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 8:
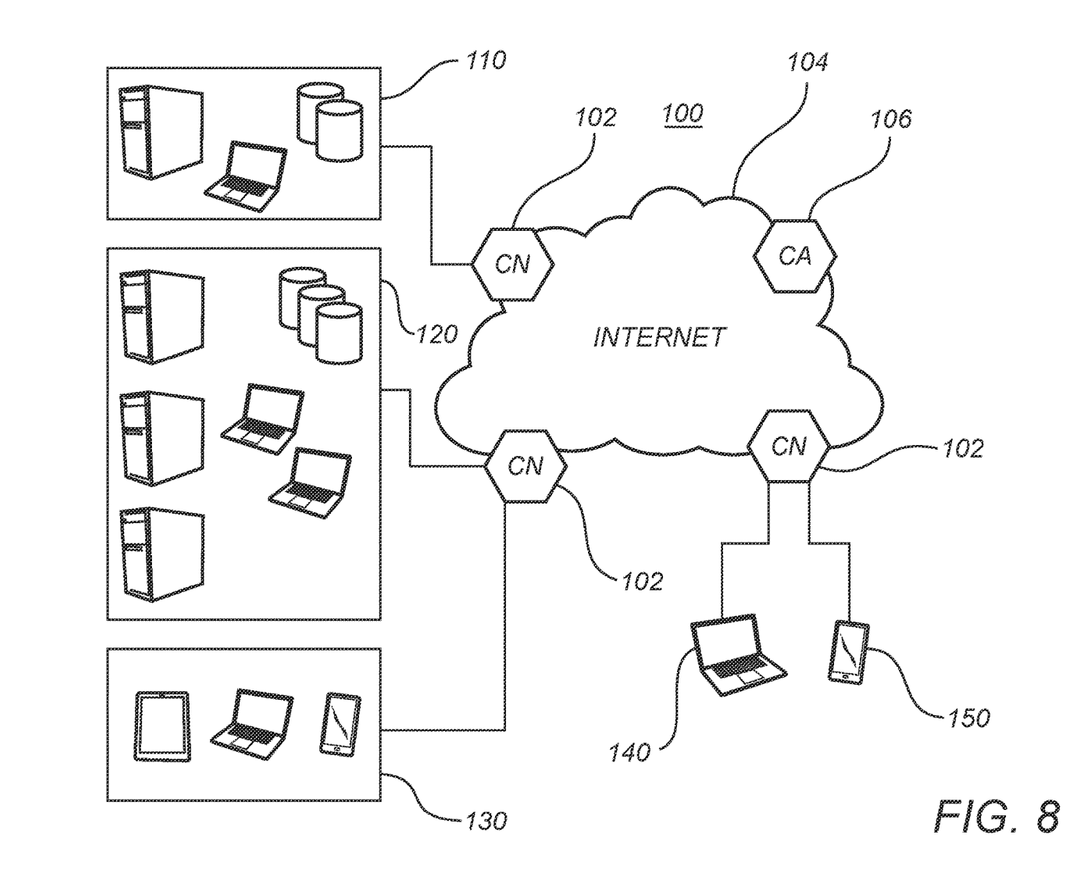
FIG. 8 is a network diagram of a cloud-based system for implementing the various algorithms and services of the present disclosure.
Figure 9:
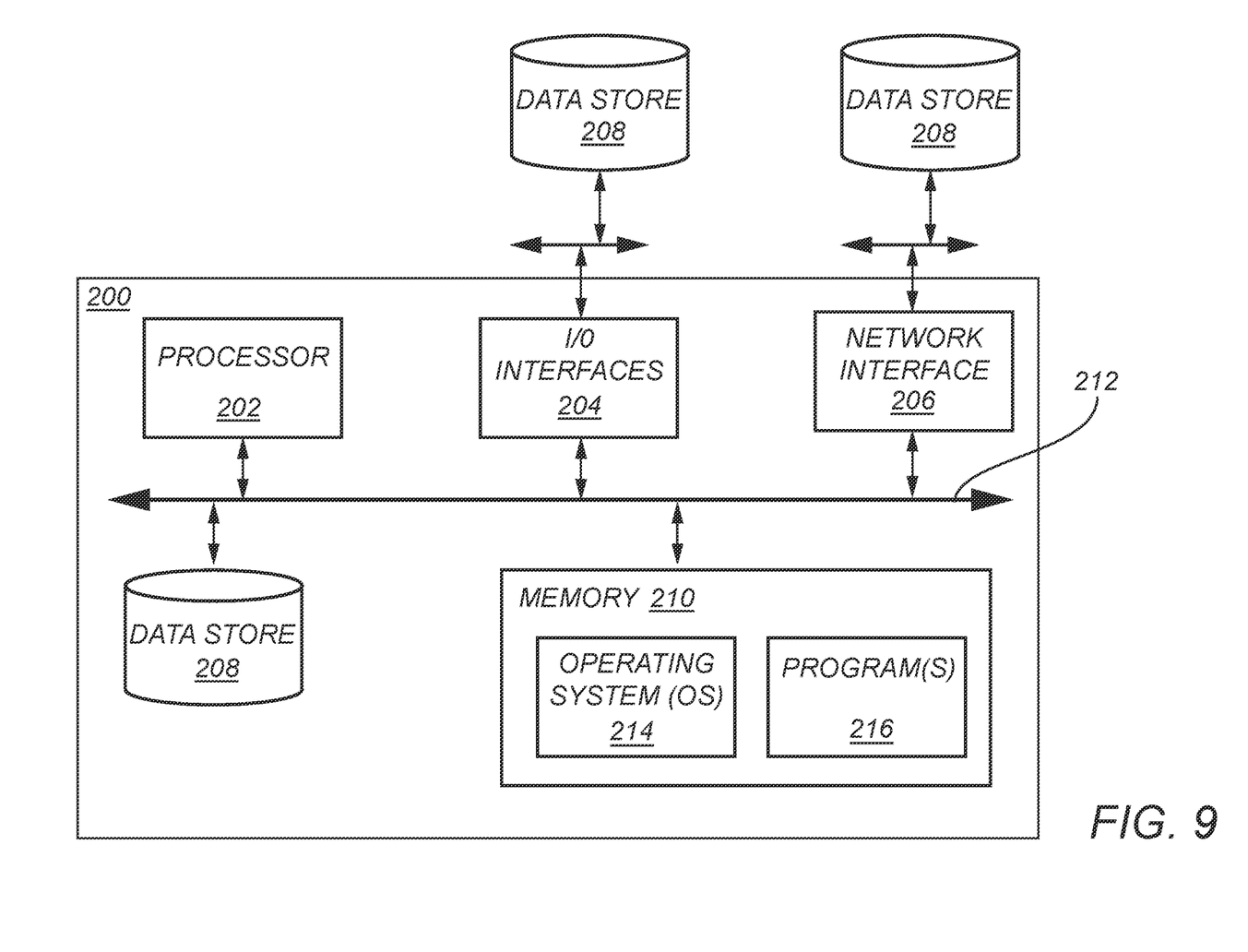
FIG. 9 is a block diagram of a server that may be used in the cloud-based system of FIG. 8 or stand-alone.

FIG. 8 is a network diagram of a cloud-based system 100 for implementing various cloud-based services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 9) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 9 is a block diagram of a server 200, which may be used in the cloud-based system 100 (FIG. 8), in other systems, or stand-alone. For example, the CNs 102 (FIG. 8) and the central authority nodes 106 (FIG. 8) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 8 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 8). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 10:
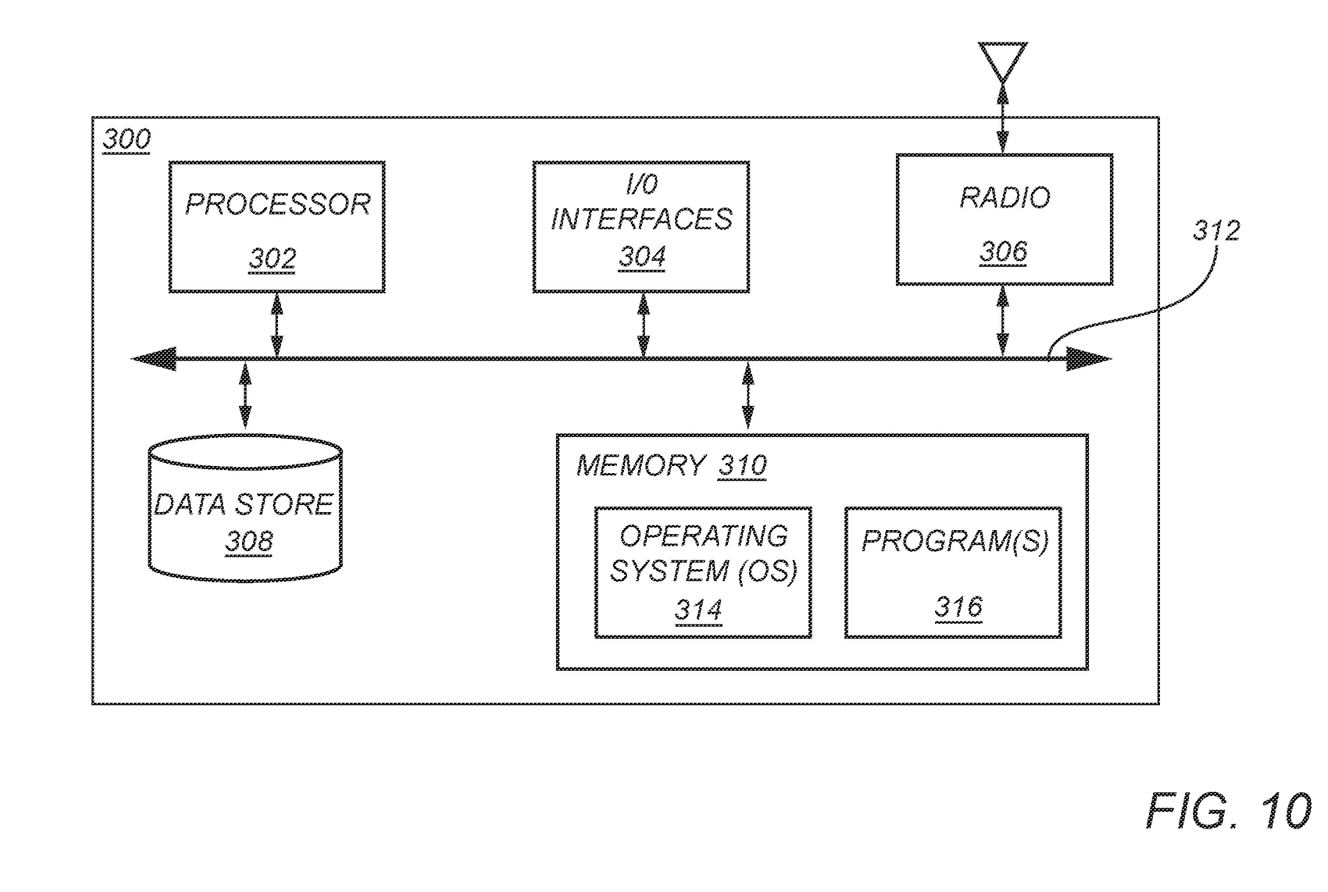
FIG. 10 is a block diagram of a user device that may be used in the cloud-based system of FIG. 8 or stand-alone.

FIG. 10 is a block diagram of a user device 300, which may be used in the cloud-based system 100 (FIG. 8), as part of a network, or stand-alone. Again, the user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 9 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 10, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 8).

Again, the present disclosure provides a system and method for removing noise from an ultrasonic signal using a GAN. GANs have been shown to perform well in removing noise from images in a variety of contexts, providing sharper images. In general, a GAN is a DNN, such as a CNN, that, in an unsupervised ML operation, involves automatically discovering and learning patterns in input data such that the resulting model can be used to generate output that plausibly could have been resulted from the original dataset. The GAN frames a problem as a supervised learning problem with two sub-models: a generator model that generates new examples and a discriminator model that classifies examples as either real (i.e., from the domain) or fake (i.e., generated). The two models are trained together in an adversarial manner until the discriminator model is fooled about half the time, meaning the generator model is generating plausible examples. Such GANs are well known to those of ordinary skill in the art, but have not yet been applied to ultrasonic sensor noise removal. The present disclosure provides three input formats for the NN in order to feed 1D input data to the network. The system is generalizable to multiple noise sources, as it learns from different motion functions and noise types. The end-to-end system of the present disclosure is trained on raw ultrasonic signals with very little pre-processing or feature extraction.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method, comprising:
receiving an input ultrasonic signal at a generator module of a generative adversarial network; and
removing noise from the ultrasonic signal using the generator module of the generative adversarial network to generate an output denoised ultrasonic signal;
wherein the input ultrasonic signal comprises a one-dimensional input ultrasonic signal; and
wherein the one-dimensional input ultrasonic signal is pre-processed before being received at the generator module of the generative adversarial network by converting the one-dimensional input ultrasonic signal into a two-dimensional M×N array that replaces the input ultrasonic signal that is received at the generator module of the generative adversarial network.

2. The method of claim 1, wherein the input ultrasonic signal comprises the one-dimensional input ultrasonic signal received from an ultrasonic sensor.

3. The method of claim 2, wherein the one-dimensional input ultrasonic signal is pre-processed before being received at the generator module of the generative adversarial network by formatting the one-dimensional input ultrasonic signal into an M×N array and then copying the M×N array corresponding to a number of channels of the one-dimensional input ultrasonic signal, thereby forming the two-dimensional M×N array that replaces the input ultrasonic signal that is received at the generator module of the generative adversarial network.

4. The method of claim 2, wherein the one-dimensional input ultrasonic signal is pre-processed before being received at the generator module of the generative adversarial network by transforming the one-dimensional input ultrasonic signal into the two-dimensional M×N array that replaces the input ultrasonic signal that is received at the generator module of the generative adversarial network using a time-frequency domain transformer.

5. The method of claim 2, wherein the one-dimensional input ultrasonic signal is pre-processed before being received at the generator module of the generative adversarial network by encoding temporal information of the one-dimensional input ultrasonic signal into dimensions of each channel, with one channel representing each of a plurality of readings, thereby forming the two-dimensional M×N array that replaces the input ultrasonic signal that is received at the generator module of the generative adversarial network.

6. The method of claim 1, wherein the generator module of a generative adversarial network comprises one of:
a convolutional neural network;
a speech enhancement generative adversarial network; and
an encoder and a decoder with a self-attention block that is adapted to generate a condensed latent vector that is concatenated with a noise vector.

7. The method of claim 1, further comprising providing the output denoised ultrasonic signal to a discriminator module of the generative adversarial network adapted to compare the output denoised ultrasonic signal to a ground truth ultrasonic signal as part of a training process.

8. The method of claim 1, further comprising using the output denoised ultrasonic signal to determine a distance to an obstacle adjacent to a system providing the input ultrasonic signal comprising information related to the obstacle.

9. A system, comprising:
memory storing a generator module of a generative adversarial network adapted to receive an input ultrasonic signal and remove noise from the ultrasonic signal to generate an output denoised ultrasonic signal;
wherein the input ultrasonic signal comprises a one-dimensional input ultrasonic signal; and
memory storing an input module adapted to pre-process the one-dimensional input ultrasonic signal before it is received at the generator module of the generative adversarial network by converting the one-dimensional input ultrasonic signal into a two-dimensional M×N array that replaces the input ultrasonic signal that is received at the generator module of the generative adversarial network.

10. The system of claim 9, wherein the input ultrasonic signal comprises the one-dimensional input ultrasonic signal received from an ultrasonic sensor.

11. The system of claim 10, further comprising the memory storing the input module adapted to pre-process the one-dimensional input ultrasonic signal before it is received at the generator module of the generative adversarial network by formatting the one-dimensional input ultrasonic signal into an M×N array and then copying the M×N array corresponding to a number of channels of the one-dimensional input ultrasonic signal, thereby forming the two-dimensional M×N array that replaces the input ultrasonic signal that is received at the generator module of the generative adversarial network.

12. The system of claim 10, further comprising the memory storing the input module adapted to pre-process the one-dimensional input ultrasonic signal before it is received at the generator module of the generative adversarial network by transforming the one-dimensional input ultrasonic signal into the two-dimensional M×N array that replaces the input ultrasonic signal that is received at the generator module of the generative adversarial network using a time-frequency domain transformer.

13. The system of claim 10, further comprising the memory storing the input module adapted to pre-process the one-dimensional input ultrasonic signal before it is received at the generator module of the generative adversarial network by encoding temporal information of the one-dimensional input ultrasonic signal into dimensions of each channel, with one channel representing each of a plurality of readings, thereby forming the two-dimensional M×N array that replaces the input ultrasonic signal that is received at the generator module of the generative adversarial network.

14. The system of claim 9, wherein the generator module of a generative adversarial network comprises one of:
a convolutional neural network;
a speech enhancement generative adversarial network; and
an encoder and a decoder with a self-attention block that is adapted to generate a condensed latent vector that is concatenated with a noise vector.

15. The system of claim 9, wherein the generator module of the generative adversarial network is further adapted to provide the output denoised ultrasonic signal to a discriminator module of the generative adversarial network adapted to compare the output denoised ultrasonic signal to a ground truth ultrasonic signal as part of a training process.

16. The system of claim 9, further comprising memory storing a processing module adapted to use the output denoised ultrasonic signal to determine a distance to an obstacle adjacent to a system providing the input ultrasonic signal comprising information related to the obstacle.

17. A non-transitory computer-readable medium comprising instructions stored in a memory and executed by a processor to execute the steps, comprising:
receiving an input ultrasonic signal at a generator module of a generative adversarial network; and
removing noise from the ultrasonic signal using the generator module of the generative adversarial network to generate an output denoised ultrasonic signal;
wherein the input ultrasonic signal comprises a one-dimensional input ultrasonic signal; and
wherein the one-dimensional input ultrasonic signal is pre-processed before being received at the generator module of the generative adversarial network by converting the one-dimensional input ultrasonic signal into a two-dimensional M×N array that replaces the input ultrasonic signal that is received at the generator module of the generative adversarial network.

18. The non-transitory computer-readable medium of claim 17, wherein the input ultrasonic signal is pre-processed before being received at the generator module of the generative adversarial network using a time-frequency domain transformer.

19. The non-transitory computer-readable medium of claim 17, wherein the generator module of a generative adversarial network comprises one of:
a convolutional neural network;
a speech enhancement generative adversarial network; and
an encoder and a decoder with a self-attention block that is adapted to generate a condensed latent vector that is concatenated with a noise vector.

20. The non-transitory computer-readable medium of claim 17, the steps further comprising providing the output denoised ultrasonic signal to a discriminator module of the generative adversarial network adapted to compare the output denoised ultrasonic signal to a ground truth ultrasonic signal as part of a training process.

* * * * *